US006362954B1

(12) United States Patent
LeVander

(10) Patent No.: US 6,362,954 B1
(45) Date of Patent: Mar. 26, 2002

(54) CARRYING CASE FOR A MOBILE OFFICE SYSTEM

(76) Inventor: Mark R. LeVander, 273 Thunder Lake Rd., Wilton, CT (US) 06897

( * ) Notice: Subject to any disclaimer, the term of this patent is extended or adjusted under 35 U.S.C. 154(b) by 0 days.

(21) Appl. No.: 09/028,831

(22) Filed: Feb. 24, 1998

Related U.S. Application Data

(63) Continuation-in-part of application No. 08/767,148, filed on Dec. 16, 1996, now Pat. No. 5,764,475.

(51) Int. Cl.[7] .................................................. H05K 7/14
(52) U.S. Cl. ....................... 361/683; 361/686; 190/100; 190/102; 190/112; 190/900; 206/305; 206/320; 206/576; 220/402; 224/270; 224/575; 224/578
(58) Field of Search ................................ 361/683, 686; 190/100, 102, 112, 900; 206/320, 305, 576; 220/402; 224/270, 575, 578

(56) References Cited

U.S. PATENT DOCUMENTS

| | | | |
|---|---|---|---|
| 4,790,431 A | 12/1988 | Reel et al. ................... 206/305 |
| 4,837,590 A | * 6/1989 | Sprague ....................... 346/145 |
| 4,896,776 A | 1/1990 | Kabanuk et al. ............. 206/576 |
| 5,214,574 A | 5/1993 | Chang ......................... 361/393 |
| 5,226,540 A | * 7/1993 | Bradbury ..................... 206/576 |
| 5,232,276 A | 8/1993 | Martin ...................... 312/208.2 |
| 5,437,367 A | 8/1995 | Martin ........................ 206/320 |
| 5,442,512 A | 8/1995 | Bradbury ..................... 361/683 |
| 5,552,957 A | * 9/1996 | Brown et al. ................ 361/683 |
| 5,764,475 A | * 6/1998 | LeVander .................... 361/683 |
| 5,808,865 A | * 9/1998 | Alves .......................... 361/685 |
| 5,883,820 A | * 3/1999 | Ota et al. ................. 364/708.1 |
| 5,887,777 A | * 3/1999 | Myles et al. ................. 224/578 |
| 6,206,480 B1 | * 3/2001 | Thompson .................. 301/625 |

* cited by examiner

Primary Examiner—Leo P. Picard
Assistant Examiner—David Foster
(74) Attorney, Agent, or Firm—St. Onge Steward Johnston & Reens LLC

(57) ABSTRACT

A case for transporting and operating a mobile office system comprised of a portable computer and a portable printer. The computer and printer are separated to protect them when being transported, yet when the case is opened both computer and printer can quickly and easily be operated from within the case with minimal connecting or repositioning. Printed paper exiting a particular printer model can be accommodated by a cutout in the base of the case or a curved ramp within the case.

18 Claims, 8 Drawing Sheets

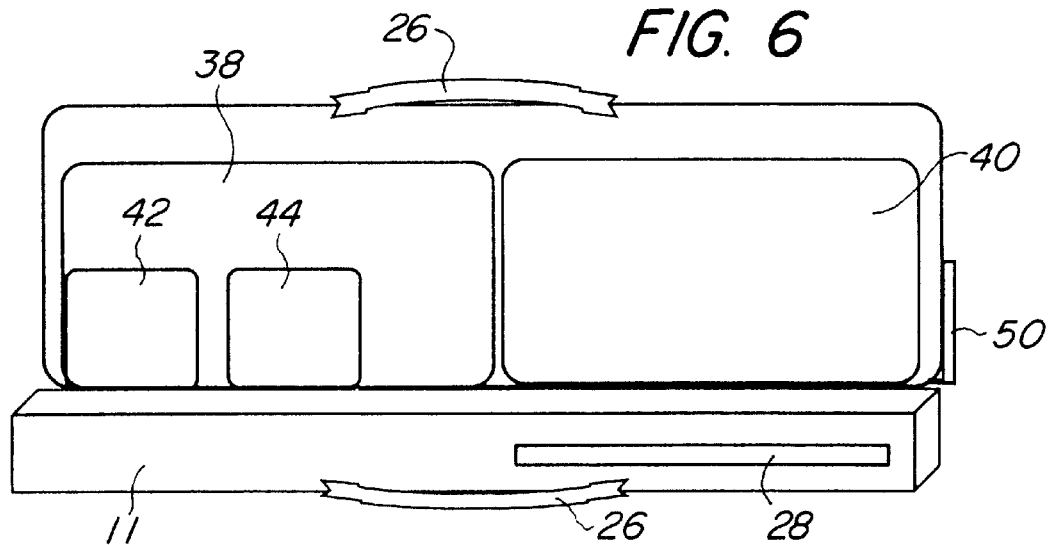
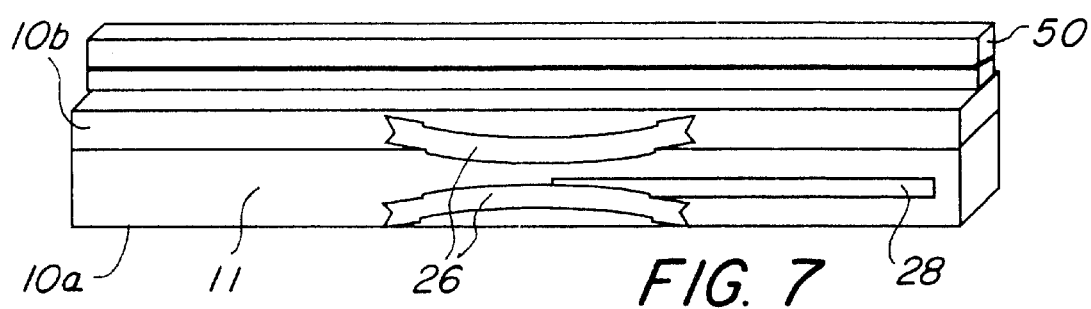
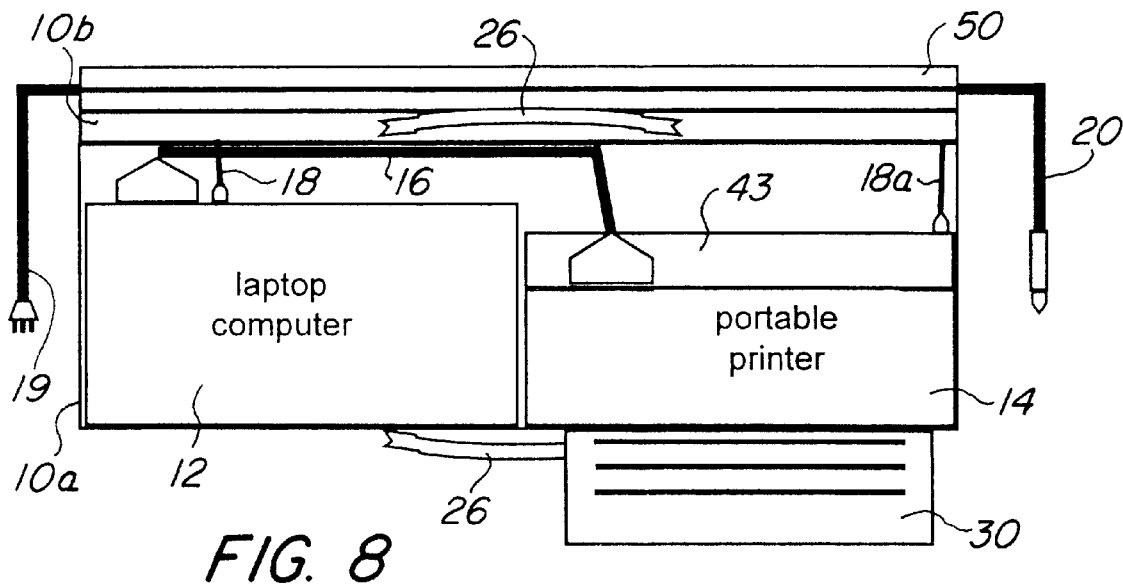

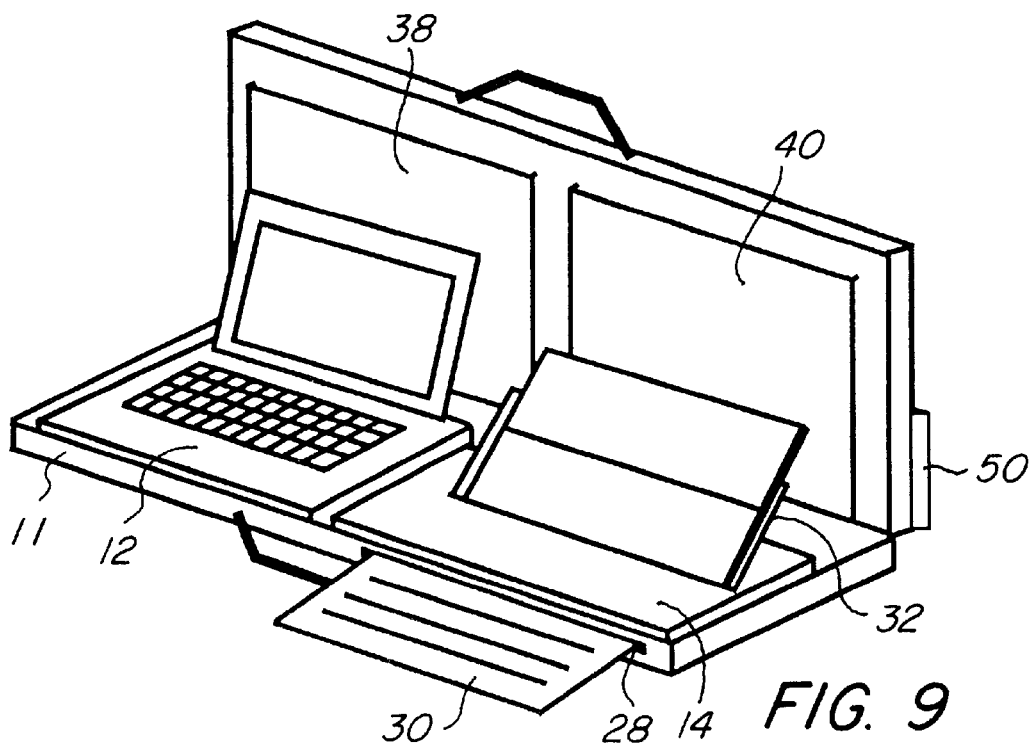
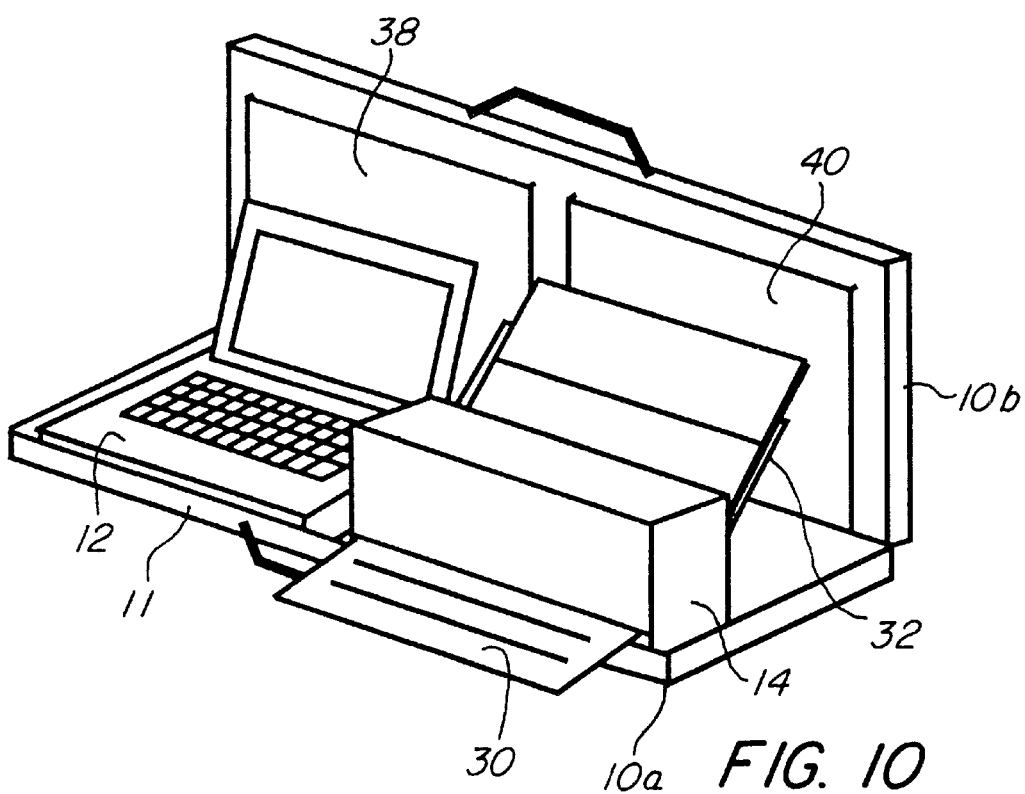

CARRYING CASE FOR A MOBILE OFFICE SYSTEM

This application is a continuation-in-part of U.S. Pat. No. 5,764,475 (Ser. No. 08/767,148) filed Dec. 16, 1996.

FIELD OF THE INVENTION

The invention relates to improvements in hand carried cases for mobile office systems which may include a portable computer, a portable printer, cable connections, a DC to AC power transformer, as well as self contained battery packs for complete portability of the office.

BACKGROUND OF THE INVENTION

Carrying cases have been devised and used in the past for transporting a computer and a printer, such as U.S. Pat. No. 4,837,590 which shows a case having a computer mounted on a platform, with a printer mounted on a second platform in which the second platform has a paper storage area under the platform for tractor fed manifold paper. A disadvantage of the prior art constructions is that although the carrying devices are considered to be mobile offices, they do not have provisions for holding all the accessories required for conducting an office when away from the user's principal office.

Prior art constructions including U.S. Pat. Nos. 5,442,512; 5,437,367; 5,232,276; 5,214,574; 4,896,776; 4,837,590; and 4,790,431 all include some form of shelves, pedestals, spacer support, platforms, frames housing fixed compartments, electrical switching banks, fasteners or clamps. A disadvantage and drawback of these prior art constructions are undesirable and unnecessary additional size, weight and complexity.

What is desired, therefore, is to provide a smaller, lighter and simpler mobile office with which salesmen, contractors or field personnel can readily transport and operate all the common equipment needed for conducting business at almost any location.

SUMMARY OF THE INVENTION

It is an object of the present invention to provide a carrying case for a mobile office system having provisions for holding all the accessories required for conducting an office when away from the user's principal office.

It is a further object of the present invention to provide a padded separator to protect the computer and printer when being transported in the case.

Another object of the present invention is to provide a zippered cover for the carrying case which features on the inside of the cover separate compartments for printer paper, working files, a calculator compartment, a pen holding section, as well as a data processor for a complete mobile office for transporting to the job site, and either: 1) using DC power from self contained batteries, in order to complete written job estimates or invoices while at the job site, 2) obtaining a power source from an AC outlet, or 3) obtaining a DC power source from a vehicle cigarette lighter.

A further feature of the present invention is to provide a cutout in a wall of the base of the carrying case for the printed paper exiting from the printer in full view of the operator. The padded carrying case is also provided with a handle for easy portability.

The present invention is especially useful for business people such as painters, cleaners, builders, plumbers, electricians, and outdoor service people, such as landscapers for taking the mobile office to the job site and either obtaining a power source from an AC outlet, or DC power from a vehicle cigarette lighter output, or self-contained batteries, in order to complete job estimates or invoices while at the job site in order to expedite interactions with customers or potential customers.

An advantage of the present invention is that because of its simplicity, components such as the computer, printer, power transformer, power surge protector, cables or adapters can quickly and easily be removed, replaced or interchanged with other commonly available models. No tools or adjustments are required other than possibly adding or removing padding that is not an integral part of the carrying case. Thus, the current invention shares the desirable characteristic of some prior art—the ability of a person to quickly open the carrying case and operate the enclosed components with minimal connecting or repositioning—yet improves upon it.

A further advantage of the present invention is that because of its simplicity and lack of fasteners, clamps, pedestals, shelves, etc. the current invention can be constructed as either a soft sided, padded case or a formed, hard shell case.

An embodiment of the current invention might include a separate pouch, gusset or compartment to contain items such as power cords, adapters, a power transformer, a power surge protector and other supplies not essential to the operation of the computer and printer. This would keep the main compartment containing the computer and printer free from additional clutter. The pouch might include small access holes connecting to the main compartment through which the ends of the power cords for the computer and printer can pass. Thus, if an external power source is being used, the appropriate electrical connections can be made within the pouch, an appropriate end of a power cord or a DC to AC power transformer can extend from the pouch to the outside of the carrying case to be plugged into an external AC or DC outlet, and only the ends of the computer and/or printer power cords need to pass through to the main compartment containing the computer and printer to complete the connections to the external power source.

Other embodiments of the current invention might exclude the cutout in a wall of the base of the carrying case that accommodates paper exiting from the printer. It is possible that a particular portable printer model may pass exiting paper above the walls of the base of the carrying case and therefore no accommodation is needed to provide for exiting paper. Furthermore, a curving ramp might be placed within the base of the case to accept paper exiting from the printer below the walls of the base of the carrying case and bend it in such a way that the paper will exit above the walls of the base of the case.

The invention and its particular features and advantages will become more apparent from the following detailed description considered with reference to the accompanying drawings.

BRIEF DESCRIPTION OF THE DRAWINGS

In order that the present invention will be entirely understood, it will now be described along with the accompanying drawings, in which:

FIG. 6 is a front elevational view of the carrying case in an open position in an embodiment that includes the separate pouch or gusset to contain power cords, adapters, a power transformer, a power surge protector and other supplies.

FIG. 7 is a front elevational view of the carrying case in a closed position with the separate pouch.

FIG. 8 is a top plan view of the carrying case with the separate pouch showing options for connection to either an AC or DC external power source.

FIG. 9 is a perspective view of the carrying case with the separate pouch.

FIG. 10 is a perspective view of the carrying case in an embodiment with the computer and printer positioned side-by-side, excluding the cutout in the wall of the base of the carrying case. The paper is exiting the printer above the front wall of the base of the carrying case.

DETAILED DESCRIPTION OF THE INVENTION

Figure 1:
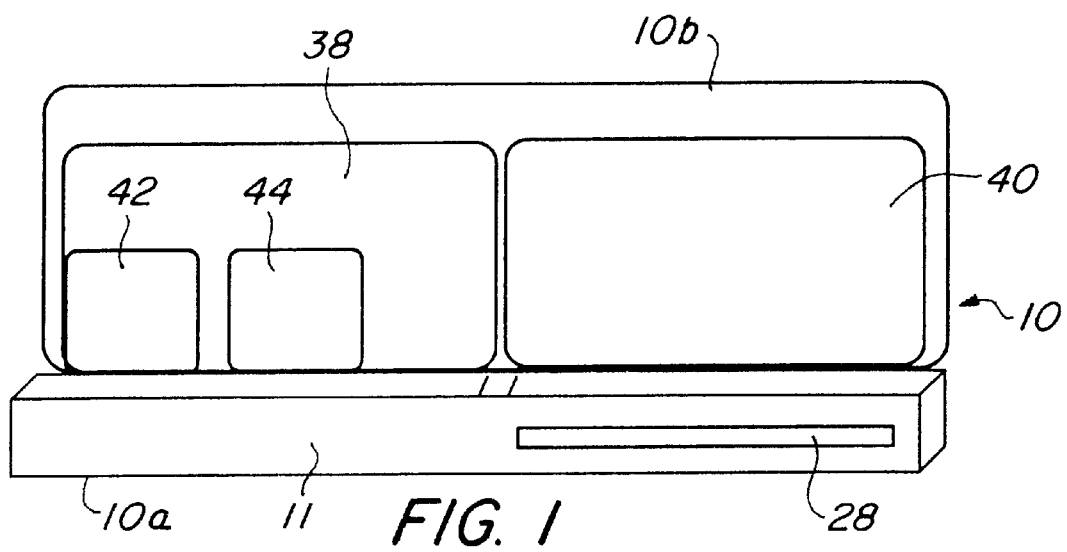
FIG. 1 is a front elevational view of the carrying case constructed in accordance with the teachings of my invention, with the case in an open position.
Figure 2:
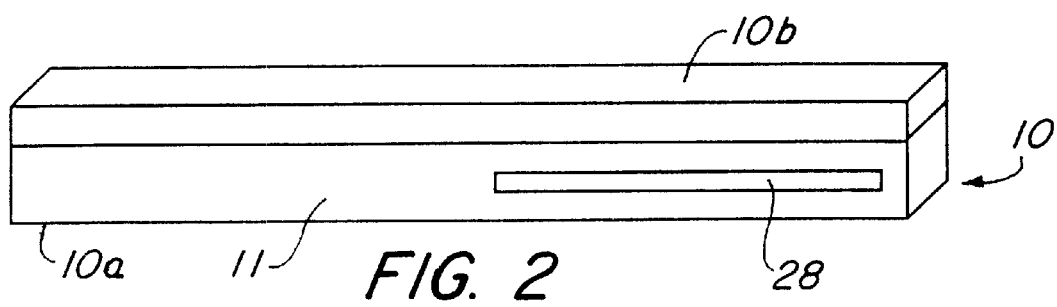
FIG. 2 is a front elevational view of the carrying case shown in FIG. 1 but with the case in a closed position.

As seen in the Figures, the carrying case for a mobile computer system is referred to generally by the reference numeral 10, and as can be observed is rectangular shaped, and is longer than it is wide in order to accommodate a computer, such as a laptop computer 12 and a portable printer 14. The case 10 has a base 10a and a releasably hinged lid 10b. The base 10a has a lip 11 extending a distance sufficient from the periphery of the base 10a to retain the computer 12 and printer 14 from sliding off the base 10a. A zippered cover can also be provided for the carrying case. It should be evident that both the computer and printer can derive a power source by being plugged into an AC outlet or a vehicle's cigarette lighter outlet through the DC to AC power transformer 20 and power cord 19. The laptop computer and printer can also be operated solely from the carrying case without any external power source by using the laptop's internal battery and a battery attachment 43, as seen in FIG. 5, for the printer.

Figure 3:
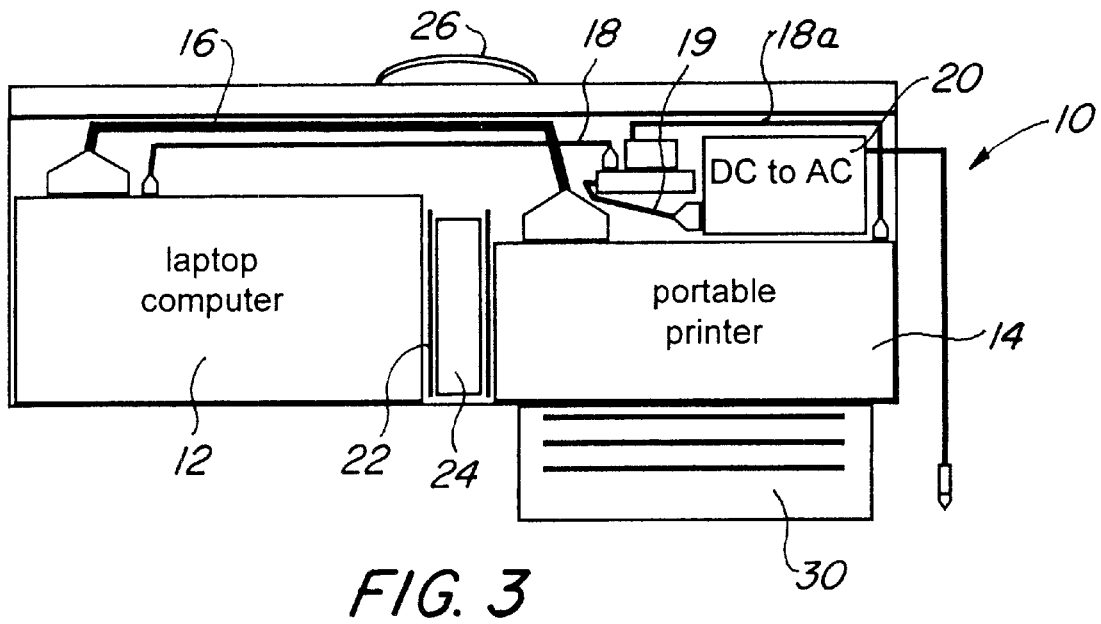
FIG. 3 is a top plan view of the carrying case with the case in an open position showing the frontal side-by-side orientation of both the laptop computer and the companion portable printer.

Referring now to FIG. 3, both computer 12 and printer 14 are located in the padded carrying case 10, but spaced from each other by padded separators 22 forming a compartment to snugly hold a stapler 24 which is often needed when fastening printed papers together. Thus, the laptop computer and printer are separated to avoid damage to either while transporting and at the same time providing a convenient location for an often necessary office article. The case 10 is also provided with a handle 26 for easily transporting the mobile office from one location to another.

Figure 4:
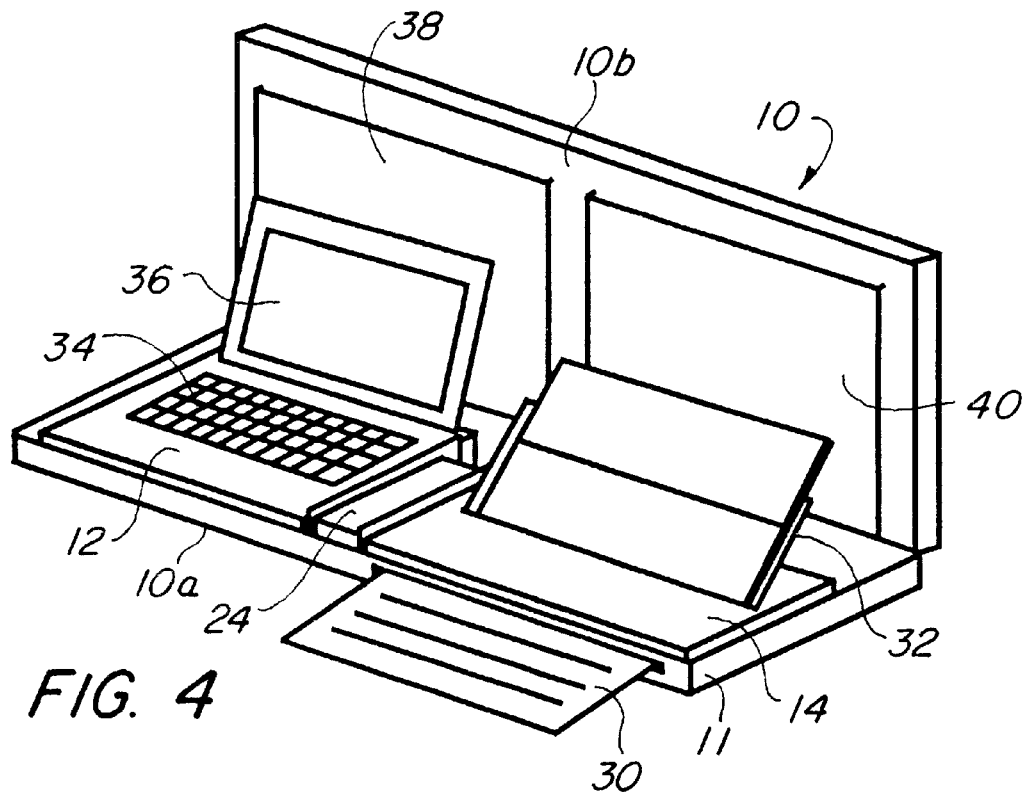
FIG. 4 is a perspective view of the carrying case showing the location of the computer and printer, and showing the printed paper exiting from the cutout in front of the carrying case.

In FIGS. 1 through 9, the carrying case 10 is provided with an elongated cutout portion 28 in the lip 11. The cutout portion 28 serves as exit location for the paper 30 which has been printed by the portable printer 14. As seen in FIG. 4, the printer 14 has a top loaded paper sheet feeder 32 so that operator or user of the of the mobile office can take a position in front of the open case 10 and be able to use the keys of the keyboard 34 while viewing the screen 36 and at the same time view the printed paper 30 exiting from the carrying case 10. Additionally, all the accessories normally used in a business office are available, such as file holding sections 38 and 40, for example for estimating sheets and customer file folders. In addition, pockets 42 and 44 are utilized for holding a calculator, as well as pens and pencils. Of course, a stapler 24 is available in the compartment formed by the padded separators 22.

Figure 5:
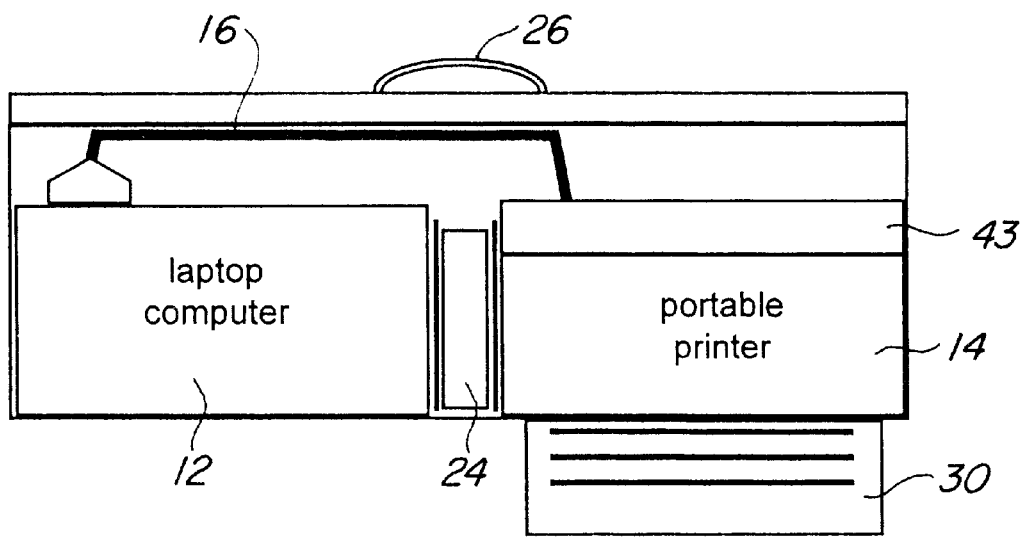
FIG. 5 is a top plan view of the carrying case as shown in FIG. 3 but with the power sources for the computer and printer being battery packs.

FIG. 5 shows my mobile office system in a completely self-sustained mode, in which the computer 12 and printer 14 are activated by battery packs, one being an integral part of the computer, the other 43, a rechargeable battery attachment for the portable printer.

It should be apparent that the carrying case 10 not only transports a laptop computer and a companion portable printer, but also carries the necessary items for providing on the spot written job estimates to potential customers, thus avoiding the usual time delay between the actual viewing and inspection of the job site and mailing of a job estimate to a potential customer thus resulting in a more efficient business practice.

FIGS. 6 through 9 show the carrying case in an embodiment that includes a separate pouch, gusset or compartment 50 for containing power cords, adapters, a power transformer, a power surge protector and other supplies not essential to the operation of the computer and printer. FIG. 8 shows options for connecting to an external power source. Either the end of the AC power cord 19 or the male plug end of the DC to AC power transformer 20 can extend from the pouch to the outside of the carrying case 10 to be plugged into either a standard AC outlet or a vehicle cigarette lighter socket respectively. This view also shows the computer 12 and printer 14 connected to the external power source via appropriate connections within the pouch 50 and with only the ends of the computer power cord 18 and printer power cord 18a passing through small access holes connecting the separate pouch and the main carrying case compartment.

Figure 11:
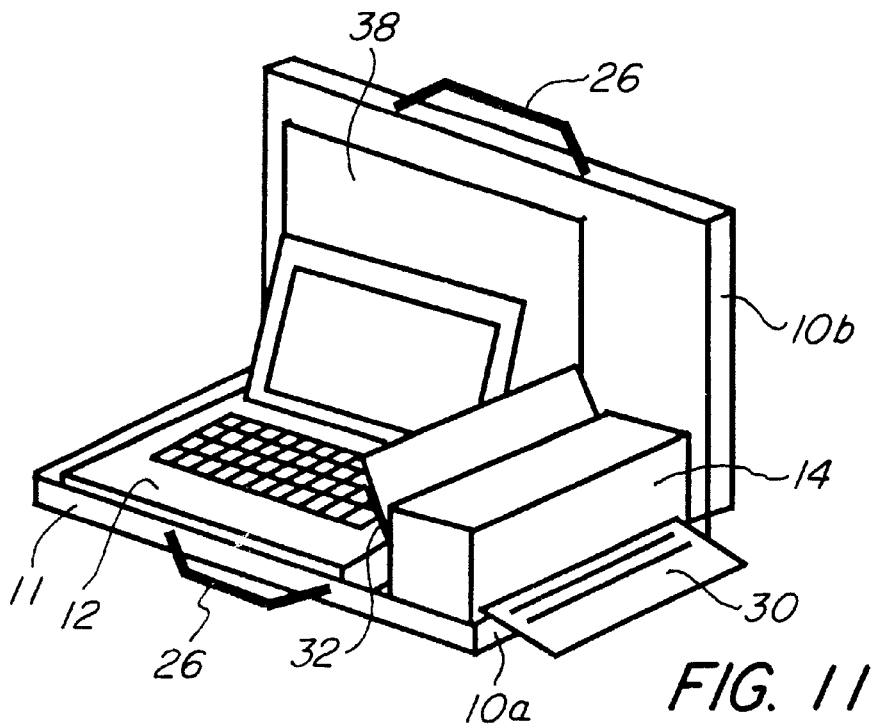
FIG. 11 is a perspective view of the carrying case in an embodiment with the printer positioned at right angles to the computer, excluding the cutout in the wall of the base of the carrying case. The paper is exiting the printer above the side wall of the base of the carrying case.

FIGS. 10 and 11 show embodiments of the carrying case with an alternate model portable printer 14 that can pass exiting printed paper 30 out of the case above the walls of the base of the case 11 therefore eliminating the need for the cutout portion in the case. Because of the dimensions of this particular printer, an embodiment of the carrying case as depicted in FIG. 11 might accommodate the printer positioned at right angles to the computer allowing for a narrower, more compact carrying case dimension.

Figure 12:
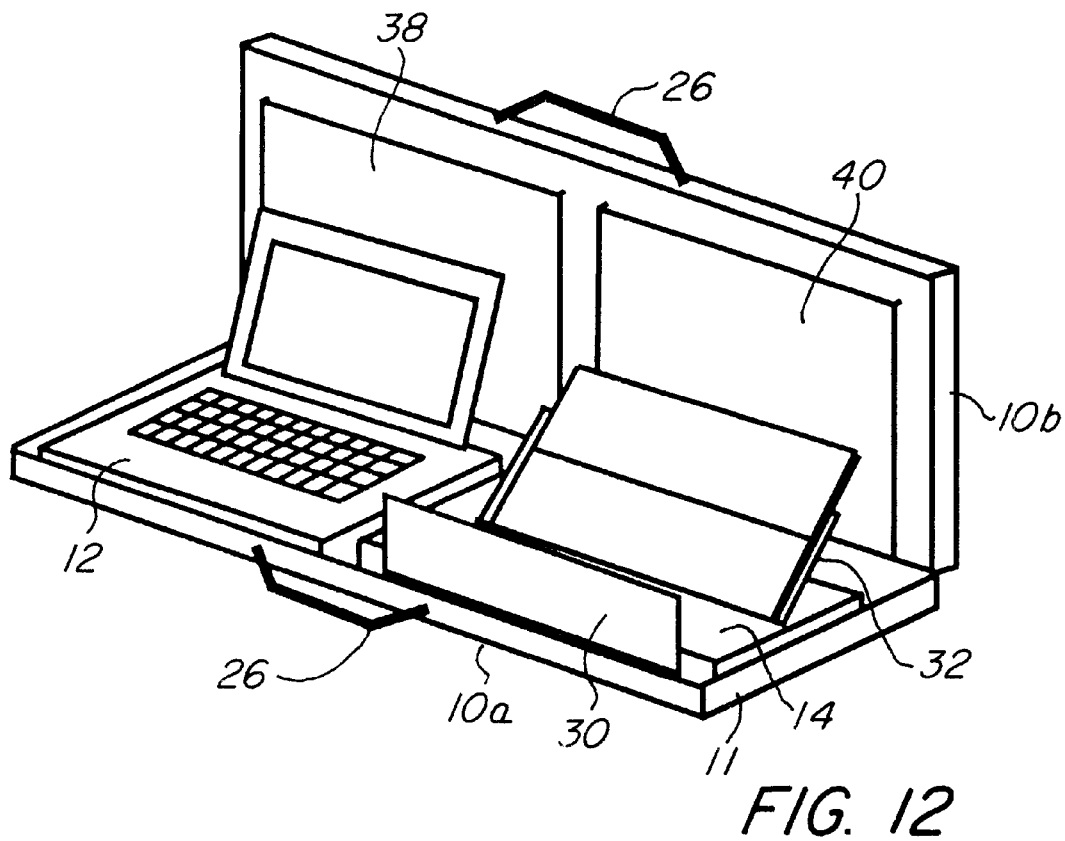
FIG. 12 is a perspective view of the carrying case utilizing a curved ramp instead of the cutout portion to accommodate the paper exiting from the printer.
Figure 13:
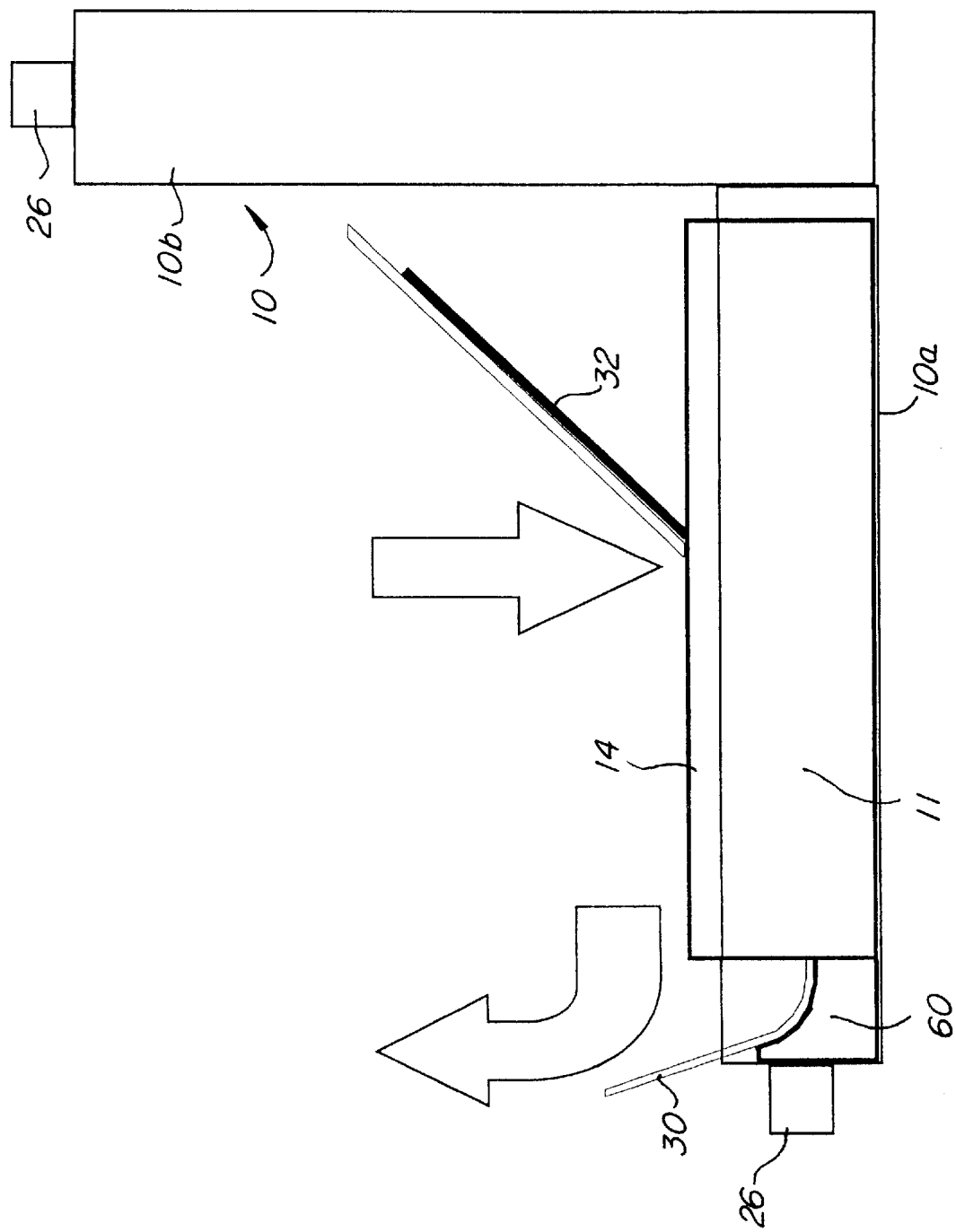
FIG. 13 is a side elevational view of the carrying case in an open position showing details of the functioning of the curved ramp.

FIGS. 12 and 13 show the carrying case utilizing a curved ramp 60 instead of the cutout portion in the wall of the base of the carrying case to accommodate the paper 30 exiting from the printer 14. In this embodiment, the paper enters the top of the printer with the assistance of the paper sheet feeder 32 and exits the front of the printer in a position below the top of the front wall of the case of the carrying case 11. The ramp 60 is curved to accept the exiting paper and bend it as it advances in such a way that the exiting paper is eventually passed out of the case above the front wall of the base of the carrying case.

Figure 14:
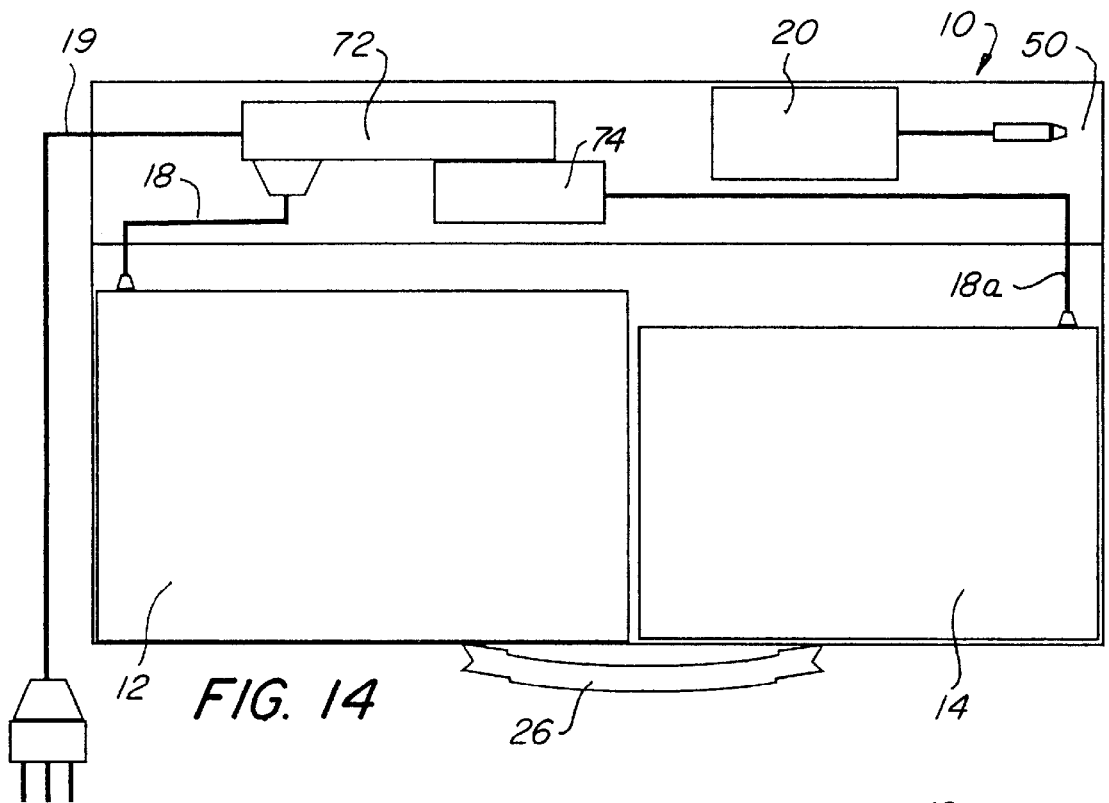
FIGS. 14 and 15 are top plan views of the carrying case in an embodiment that includes the separate pouch and details of some possible connections of the power cords, adapters, power transformer and power surge protector contained within the pouch.
Figure 15:
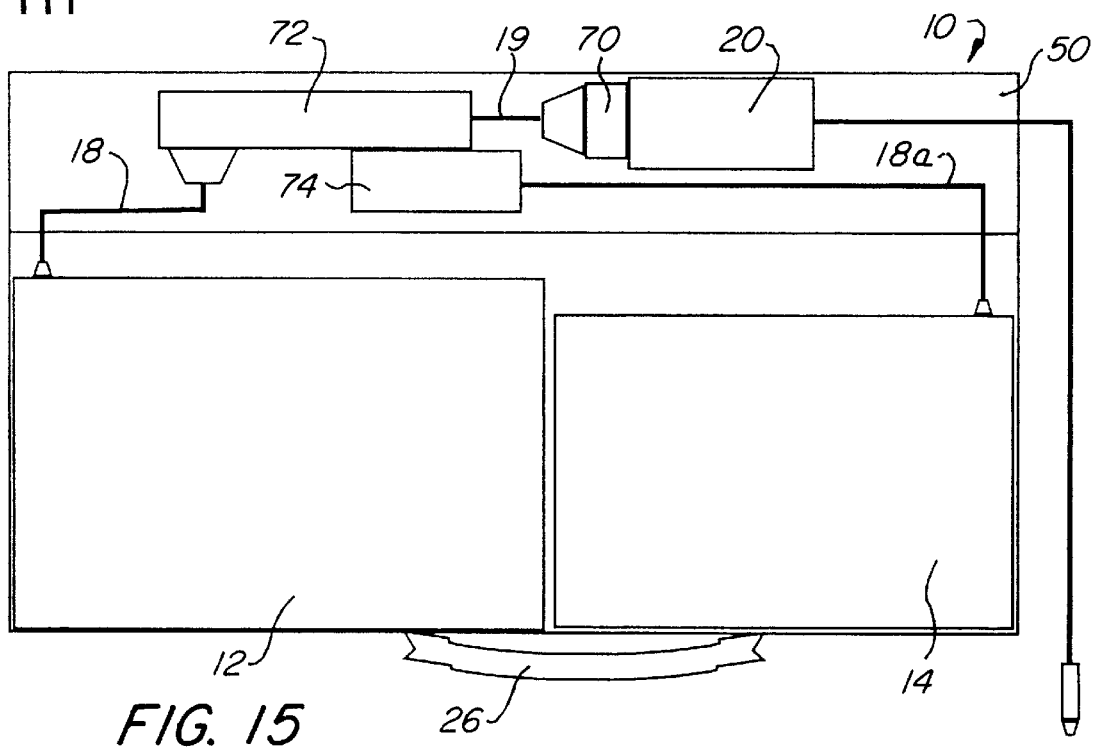

FIGS. 14 and 15 show details of some possible electrical connections within the separate pouch 50. In FIG. 14, the extension power cord 19 has the male end, with a separate power surge protector 70 attached, extended from the pouch to the outside of the carrying case for connection to an external standard AC outlet. Inside the pouch, the female end of the extension power cord 72 has multiple receptacles. The computer power cord 18 has one end plugged into a receptacle of the extension power cord and the other end passed through a small access hole between the pouch and the main carrying case compartment to be plugged into the computer 12. Likewise, the printer power cord 18a has one end plugged into a receptacle of the extension power cord and the other end passed through a second small access hole between the pouch and the main carrying case compartment to be plugged into the printer 14. In this particular configuration, the portable printer model has an AC to DC power adapter 74 at one end of the printer power cord.

FIG. 15 shows a configuration for utilizing an external DC power source. The DC to AC power transformer 20 has its power cord and plug extended from the pouch to the outside of the carrying case to be plugged into a vehicle cigarette lighter. Inside the pouch, the power surge protector 70 is plugged into the DC to AC power transformer. The extension power cord 19 is plugged into the power surge protector. The computer power cord 18 is plugged into the extension power cord and one end is passed through a small access hole between the pouch and the main carrying case compartment to be plugged into the computer 12. Likewise, the printer power cord 18a with AC to DC adapter 74 is plugged into the extension power cord and one end is passed through a second small access hole between the pouch and the main carrying case compartment to be plugged into the printer 14.

Figure 16:
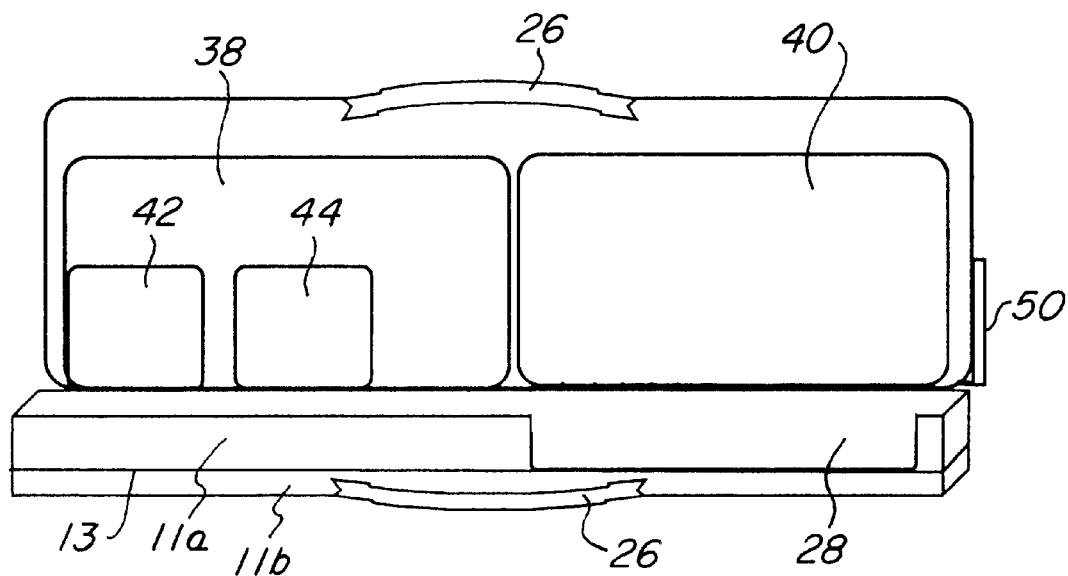
FIG. 16 is a front elevational view of the carrying case in an open position in an embodiment that has a cutout without an upper lip and a hinged lid that extends to the lower edge of the cutout.
Figure 17:
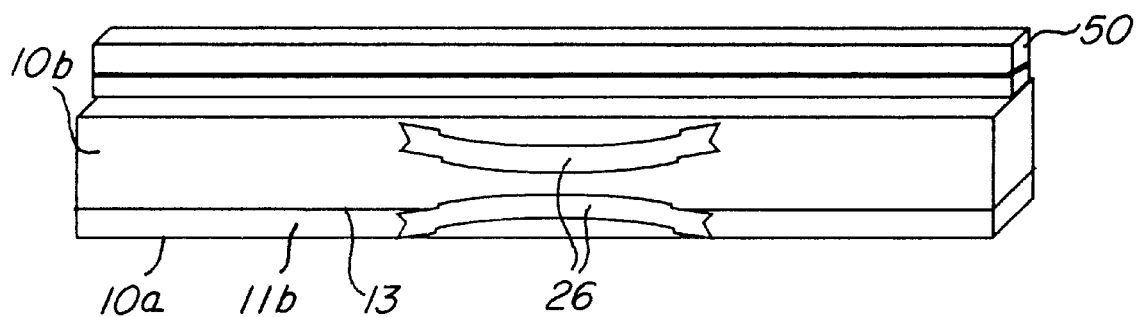
FIG. 17 is a front elevational view of the carrying case in a closed position with the hinged lid that extends to the lower edge of the cutout.

FIGS. 16 and 17 show another embodiment of the carrying case in which the cutout portion 28 does not have an upper lip and the lid 10b extends to the lower edge of the cutout portion 28. The cutout portion 28 does not have an upper lip such that the lip 11 borders the cutout portion 28 only on three sides. The lid 10b when closed extends to the edge of the lower lip 11b or below, which defines a second distance 13 extending from the base 10a, which is less than the distance of the rest of the upper lip 11a extending from the base 10a. A zipper can seal the lid 10b and the base 10a of the carrying case at this second distance 13.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A case for receiving and containing a computer, printer and associated cables for transport and use, the case comprising:

a base for receiving the computer and printer thereon;

a lid, releasably closeable to said base defining a case volume to contain the computer and printer for transport;

a pouch connected to said lid for storing the cables useable with the computer and printer;

a hole in said lid providing a passage between said pouch and the case volume for connecting the cables to the computer.

2. The case of claim 1 including a second hole in said lid providing a passage between said pouch and the case volume for connecting the cables to the printer.

3. The case of claim 1 including a DC transformer for transforming between DC at different voltages.

4. The case of claim 3 including a cigarette lighter plug electrically coupled to said DC transformer.

5. The case of claim 1 including a lip extending from a periphery of said base to retain the computer and printer therein.

6. The case of claim 5 including a cutout in said lip to permit a printed page to exit said base from the printer.

7. The case of claim 5 including a ramp to divert a printed page over said lip to exit said base.

8. A case for receiving and containing a computer and printer for transport and use, the case comprising:

a base for receiving the computer and printer thereon;

a lid, releasably closeable to said base for containing the computer and printer for transport;

a DC transformer for transforming between DC at different voltages;

a plug electrically coupled to said DC transformer and insertable to a vehicle cigarette lighter for drawing DC power; and a harness electrically connectable to said DC transformer for charging a battery for the computer.

9. The case of claim 8 including an AC adapter for converting between AC and DC.

10. The case of claim 9 including a surge protector and wherein said AC adapter is electrically connected to said surge protector.

11. The case of claim 8 wherein said DC transformer comprises a surge protector.

12. The case of claim 8 a lip extending from a periphery of said base to retain the computer and printer therein.

13. A case for receiving and containing a computer and printer for transport and use, the case comprising:

a base for receiving the computer and printer thereon;

a lip extending from a periphery of said base a distance sufficient to retain the computer and printer from sliding off said base;

means for permitting a printed page to move out of said base while the printer retained;

a lid, releasabey closeable to said lip for containing the computer and printer for transport; and wherein said printed page permitting means comprises a cutout portion in said lip.

14. The case of claim 13 wherein said cutout portion provides a region in which said lip extends a second distance less than the sufficient distance.

15. The case of claim 14 wherein said lid is releasably closeable to said base along said lip at said second distance.

16. The case of claim 13 wherein said printed page permitting means is a ramp adjacent said lip for diverting the printed page.

17. The case of claim 13 including a pouch connected to said lid for storing cables useable with the computer and printer.

18. The case of claim 13 including a DC transformer for transforming between DC at different voltages.

* * * * *